US011050798B2

(12) United States Patent
Kilburn

(10) Patent No.: US 11,050,798 B2
(45) Date of Patent: Jun. 29, 2021

(54) METHODS FOR ESTABLISHING PEER-TO-PEER COMMUNICATIONS USING DISTRIBUTED CALL LEDGERS

(71) Applicant: MITEL NETWORKS CORPORATION, Ottawa (CA)

(72) Inventor: Michael Kilburn, Bastrop, TX (US)

(73) Assignee: Mitel Networks Corporation, Ottawa (CA)

( * ) Notice: Subject to any disclaimer, the term of this patent is extended or adjusted under 35 U.S.C. 154(b) by 0 days.

(21) Appl. No.: 16/428,567

(22) Filed: May 31, 2019

(65) Prior Publication Data
US 2020/0382364 A1 Dec. 3, 2020

(51) Int. Cl.
*H01L 29/06* (2006.01)
*H04M 7/00* (2006.01)
(Continued)

(52) U.S. Cl.
CPC ........ *H04L 65/1069* (2013.01); *G06F 16/134* (2019.01); *H04L 41/082* (2013.01);
(Continued)

(58) Field of Classification Search
CPC ............ H04L 12/1813; H04L 12/1822; H04L 65/1069; H04L 65/1083; H04L 65/1093;
(Continued)

(56) References Cited

U.S. PATENT DOCUMENTS 7,522,710 B2    4/2009    Gray et al.
8,266,477 B2    9/2012    Mankovskii et al.
(Continued)

FOREIGN PATENT DOCUMENTS

CN          101841522 B    *    11/2013
WO      WO 2016/0039985 A1        3/2016
(Continued)

OTHER PUBLICATIONS

Frank Dabek et al. "Building Peer-to-Peer Systems With Chord, a Distributed Lookup Service", MIT Laboratory for Computer Science, 2001, 6 pages. (Year: 2001).*
(Continued)

*Primary Examiner* — George C Neurauter, Jr.

(57) ABSTRACT

An example method of blockchain-enabled peer-to-peer communications is provided. The method is implemented in a communications system employing a peer-to-peer call network to provide communications capabilities between endpoints (nodes) of the call network. The system supports a distributed ledger system which enables the propagation of signaling data to initiate communications between nodes and for recording call data to provide an open, tamper-resistant log of activity on the network. Further, the system supports decentralized applications executable at nodes of the call network to customize call handling based on user preferences. In particular, the system may further support a distributed file system associated with the call network to store internal state data of the decentralized applications. The decentralized applications may thus be executed on individual, relevant nodes of the call network (i.e. relevant to the communications channel). Further, the decentralized applications provide customizable, programmable call handling management within the system.

16 Claims, 6 Drawing Sheets

(51) Int. Cl.

| | | |
|---|---|---|
| *H04M 3/02* | (2006.01) | |
| *G06F 16/13* | (2019.01) | |
| *H04L 12/24* | (2006.01) | |
| *H04L 29/08* | (2006.01) | |
| *H04L 29/06* | (2006.01) | |

(52) U.S. Cl.
CPC ...... *H04L 65/1076* (2013.01); *H04L 65/1093* (2013.01); *H04L 67/104* (2013.01); *H04L 67/22* (2013.01); *H04M 3/02* (2013.01); *H04M 7/0024* (2013.01); *H04M 7/0063* (2013.01)

(58) Field of Classification Search
CPC ... H04L 65/403; H04L 67/104; H04L 41/082; H04L 65/1076; H04L 67/22; H04M 3/02; H04M 7/0024; H04M 7/0027; H04M 7/003; H04M 7/0033; H04M 7/0036; H04M 7/0039; H04M 7/0042; H04M 7/0045; H04M 7/0048; H04M 7/0051; H04M 7/0054; H04M 7/0057; H04M 7/0063; G06F 16/134
See application file for complete search history.

(56) References Cited

U.S. PATENT DOCUMENTS

| | | | | |
|---|---|---|---|---|
| 10,397,784 | B2 * | 8/2019 | Marjou | H04L 65/102 |
| 10,469,362 | B1 * | 11/2019 | Burns | H04L 45/121 |
| 10,749,879 | B2 * | 8/2020 | Pack | H04L 63/0428 |
| 2008/0120702 | A1 * | 5/2008 | Hokimoto | H04L 67/104 726/4 |
| 2012/0110057 | A1 * | 5/2012 | Hautakorpi | H04L 67/1065 709/201 |
| 2014/0269674 | A1 * | 9/2014 | Meghani | H04L 47/805 370/352 |
| 2015/0229635 | A1 * | 8/2015 | Saridaki | H04L 67/02 726/8 |
| 2018/0255130 | A1 * | 9/2018 | Kozloski | H04L 67/22 |
| 2018/0302215 | A1 * | 10/2018 | Salgueiro | H04L 65/403 |
| 2019/0036932 | A1 * | 1/2019 | Bathen | H04L 9/3231 |
| 2019/0305952 | A1 * | 10/2019 | Hamel | H04L 9/3271 |
| 2019/0320004 | A1 * | 10/2019 | Allen | H04L 65/608 |
| 2019/0320006 | A1 * | 10/2019 | Allen | H04L 65/4092 |
| 2019/0320014 | A1 * | 10/2019 | Allen | H04L 67/18 |
| 2020/0127832 | A1 * | 4/2020 | Ebrahimi | H04L 9/0866 |
| 2020/0145421 | A1 * | 5/2020 | Tin | H04L 9/3239 |
| 2020/0145473 | A1 * | 5/2020 | Cumaranatunge | H04L 65/80 |

FOREIGN PATENT DOCUMENTS

| | | | | |
|---|---|---|---|---|
| WO | WO-2019227225 | A1 * | 12/2019 | H04L 9/3239 |
| WO | WO-2020100126 | A1 * | 5/2020 | G06F 16/182 |

OTHER PUBLICATIONS

A. Keranen et al. "Request for Comments (RFC) 8445: Interactive Connectivity Establishment (ICE): A Protocol for Network Address Translator (NAT) Traversal", Internet Engineering Task Force (IETF), Jul. 2018, 100 pages. (Year: 2018).*
Ross J. Bille et al. "RTCSS: A Framework for Developing Real-Time Peer-to-Peer Web Applications", ACSW '16 Multiconference, Feb. 2-5, 2016, Canberra, Australia, 10 pages. (Year: 2016).*
Ion Stoica et al. "Chord: A Scalable Peer-to-peer Lookup Service for Internet Applications", SIGCOMM'01, Aug. 27-31, 2001, San Diego, California, USA, 12 pages. (Year: 2001).*
W3C. "Identity for WebRTC 1.0", W3C Candidate Recommendation Sep. 27, 2018, 19 pages. (Year: 2018).*
M. Hanley et al. "Request for Comments (RFC) 4566: SDP: Session Description Protocol", Network Working Group, Jul. 2006, 49 pages. (Year: 2006).*
R. Mahy et al. "Request for Comments (RFC) 5766: Traversal Using Relays around NAT (TURN): Relay Extensions to Session Traversal Utilities for NAT (STUN)", Internet Engineering Task Force, Apr. 2010, 67 pages. (Year: 2010).*
C. Jennings et al. "Request for Comments (RFC) 6940: Resource Location and Discovery (RELOAD) Base Protocol", Internet Engineering Task Force, Jan. 2014, 176 pages. (Year: 2014).*
R. Ravindranath et al. "Request for Comments (RFC) 8124: The Session Description Protocol (SDP): WebSocket Connection URI Attribute", Internet Engineering Task Force, Mar. 2017, 12 pages. (Year: 2017).*
Mozilla Foundation. "Signaling and video calling", MDN web docs, publicly posted Apr. 10, 2019, 27 pages. (Year: 2019).*
W3C. "WebRTC 1.0: Real-time Communication Between Browsers", W3C Candidate Recommendation Sep. 27, 2018, 222 pages. (Year: 2018).*
Medium.com. "Blockchain and Peer to Peer VOIP communication over WebRTC", posted by @altanai, Nov. 29, 2018, 7 pages. (Year: 2018).*
Elie F. Kfoury et al. "Decentralized Distribution of PCP Mappings Over Blockchain for End-to-End Secure Direct Communications", date of publication Aug. 8, 2019, 15 pages. (Year: 2019).*
Elie F. Kfoury and David J. Khoury. "Secure End-to-End VoIP System Based on Ethereum Blockchain", Journal of Communications vol. 13, No. 8, Aug. 2018, 6 pages. (Year: 2018).*
Altanai. "Blockchain and Peer to Peer VOIP communication overWebRTC", publicly posted at medium.com on Nov. 29, 2018, 10 pages. (Year: 2018).*
J. Rosenberg. "Request for Comments (RFC) 5245: Interactive Connectivity Establishment (ICE): A Protocol for Network Address Translator (NAT) Traversal for Offer/Answer Protocols", Internet Engineering Task Force (IETF), Apr. 2010, 117 pages. (Year: 2010).*
Jan Seedorf. "Security Challenges for Peer-to-Peer SIP", IEEE Network, Sep./Oct. 2006, 8 pages. (Year: 2006).*

* cited by examiner

US 11,050,798 B2

METHODS FOR ESTABLISHING PEER-TO-PEER COMMUNICATIONS USING DISTRIBUTED CALL LEDGERS

FIELD

The specification relates generally to communications systems, and more particularly systems and methods for peer-to-peer communications.

BACKGROUND

Communications systems can be large and complex, including multiple servers, switching and routing entities, proxies, relay stations and other components to provide communication capabilities between endpoints. Each component is technically compatible to provide unified communications protocols. However, these components can be difficult to update, requiring down-time and multiple stages to ensure continued unified communications.

SUMMARY

The present specification relates generally to a communications system employing a peer-to-peer call network to provide communications capabilities between endpoints (nodes) of the call network. The system supports a distributed ledger system for recording transactions containing call data (i.e. data pertaining to communications channels between nodes) to provide an open, tamper-resistant log of activity on the network. Further, the system supports decentralized applications executable at nodes of the call network to customize call handling based on user preferences. In particular, the system may further support a distributed file system associated with the call network to store internal state data of the decentralized applications. The decentralized applications may thus be executed on individual, relevant nodes of the call network (i.e. relevant to the communications channel). Further, the decentralized applications provide customizable, programmable call handling management within the system, without requiring time-consuming and cumbersome updates to multiple, centralized core components of the system.

According to an aspect of this specification, a method of initiation a communications channel at a source node is provided. The method includes generating an initiation an initiation request to initiate a communications channel between the source node and a destination node in the peer-to-peer call network, the initiation request including signaling data for the source node to allow the destination node to establish a signaling channel. The method further includes sending the initiation request to the peer-to-peer call network to be propagated to the destination node. The method further includes when the signaling channel between the source node and the destination node has been established, establishing a peer-to-peer media channel between the source node and the destination node, wherein the signaling channel and the media channel form the communications channel between the source node and the destination node.

According to another aspect of the specification, a method of initiating a communications channel at a destination node is provided. The method includes receiving, from the peer-to-peer call network, an initiation request to initiate a communications channel between a source node and the destination node, the initiation request including signaling data for the source node. The method further includes establishing a signaling channel between the source node and the destination node based on the signaling data for the source node. The method further includes establishing a peer-to-peer media channel between the source node and the destination node, wherein the signaling channel and the media channel form the communications channel.

According to another aspect of the specification, a non-transitory computer-readable medium storing a plurality of computer-readable instructions executable by a processor of a client node is provided. Execution of the instructions configures the processor to generate an outgoing initiation request to initiate a first communications channel between the client node and a first end node. Execution of the instructions further configures the processor to propagate the outgoing initiation request, the outgoing initiation request including signaling data for establishing a first signaling channel between the client node and the first end node. Execution of the instructions further configures the processor to establish a first media channel between the client node and the first end node, the first media channel and the first signaling channel forming the first communications channel.

BRIEF DESCRIPTION OF DRAWINGS

Implementations are described with reference to the following figures, in which.

DETAILED DESCRIPTION

The present specification relates generally to a communications system employing a peer-to-peer network to provide communication capabilities between endpoints. The peer-to-peer network supports decentralized data storage and decentralized applications and allows users to manage their own keys and preferences while reducing the core components containing unified communications (UC) logic and central databases prone to being hacked.

Figure 1:
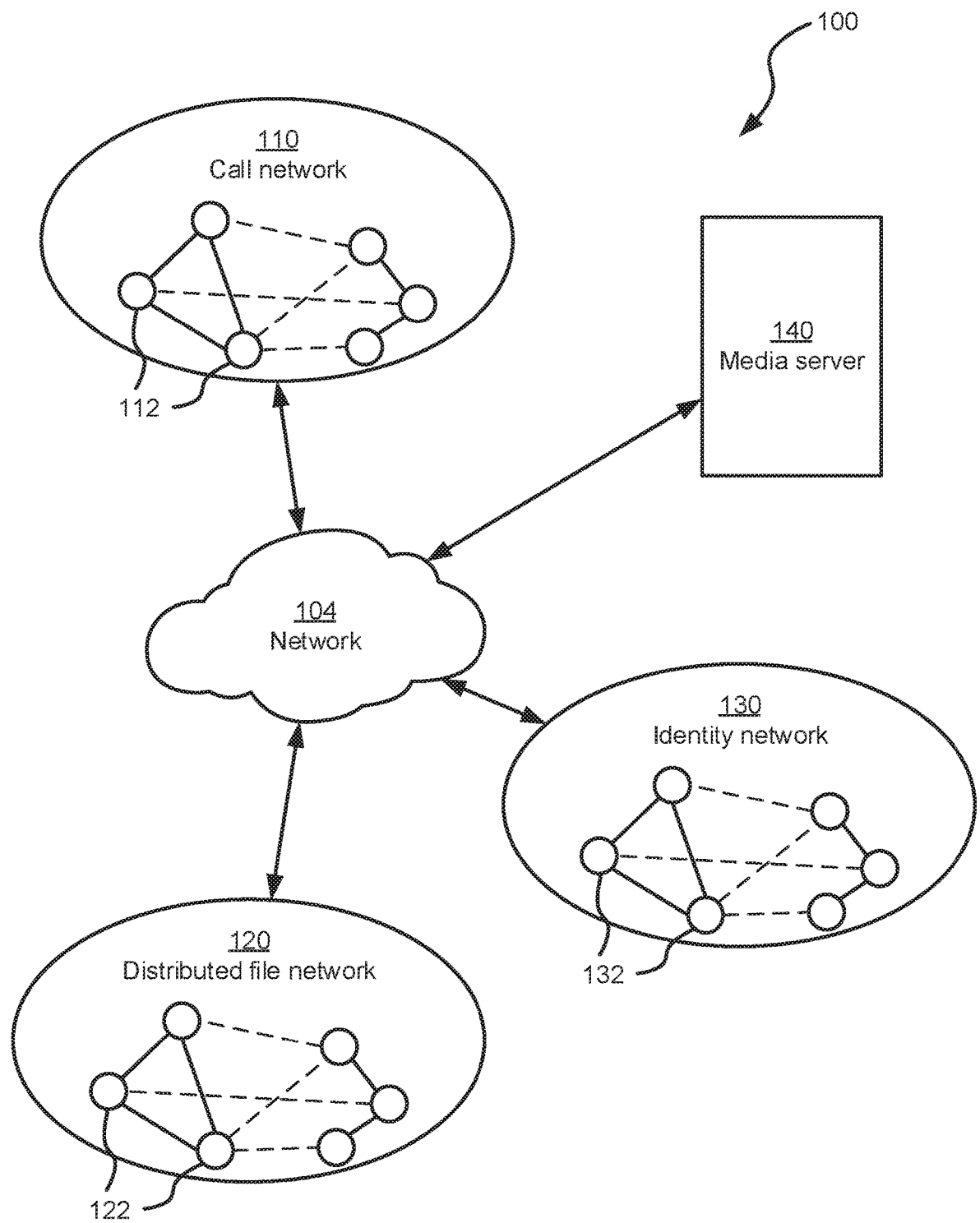
FIG. 1 depicts a schematic of an example system for peer-to-peer communications.

FIG. 1 depicts an example communications system 100 for peer-to-peer communications. The system 100 includes a network 104, a call network 110, a distributed file network 120, an identity network 130, and a media server 140.

The network 104 may include any one of, or any combination of, a local area network (LAN) defined by one or more routers, switches, wireless access points, or the like. The network 104 may also include any suitable wide area network (WAN) including cellular networks and the Internet.

The call network 110 is a collection of interconnected nodes 112 forming a peer-to-peer network. The call network 110 is generally configured to allow for calls, such as Voice over Internet Protocol (VoIP) calls, video calls, messages, and other communications services between nodes 112 of the peer-to-peer network. In particular, as will be described further herein, the call network 110 is configured to facilitate establishment of the communications channel between two client nodes 112 for the call (e.g. in response to a request for connection from one of the client nodes). The nodes 112 in the peer-to-peer call network 110 are connected to the network 104 via communication links (e.g. a direct link, or a link that traverses one or more networks, including both local and wide-area networks). Thus, the network 104 serves to interconnect the nodes 112 within the call network 110.

The nodes 112 are generally computing devices capable of communicating via the network 104 to other nodes 112 in the call network, as will be described in further detail below. For example, the nodes 112 may be servers, desktop computers, mobile computing devices, or the like. The nodes 112 need not be implemented as individual computing devices, but rather are shown as individual computing devices for clarity of illustration. For example, a node 112 may be implemented as a subsystem, including one or more further networks, a plurality of servers and other computing devices (not shown). In some examples, a node 112 may be a client computing device connected, for example on a browser via a communications protocol (e.g. WebSocket), to a web server, which is interconnected with other nodes 112 in the call network.

In some embodiments, the call network 110 may implement and maintain a distributed ledger system (DLS), maintaining transactions for communications channel and call data. Said DLS is thus referred to herein as the distributed call ledger, or simply the call ledger. For example, transactions can include requests to initiate communications channels, indications of successfully established communications channels, and termination of communications channels, as well as the relevant parties, timestamps, and other call data. Each node 112 maintains a local copy of the call ledger and may initiate updates to the call ledger (i.e. in the form of committing transactions to the call ledger), validate the updates, and broadcast or propagate the updates to nodes 112 to update respective local copies of the ledger. In some embodiments, the call network 110 may further implement a distributed hash table to allow for efficient identification (i.e. in a lookup services framework) of end nodes 112 during establishment of a communications channel.

The distributed file network 120 is a collection of interconnected nodes 122 forming a peer-to-peer network. The distributed file network 120 is generally configured to store data (e.g. user data, internal state data for applications, and the like) and files in a distributed and decentralized manner. The distributed file network 120 may support the call network 110 to allow storage of internal state data for decentralized applications in the call network 110, and in particular, providing such storage external to the call ledger. Specifically, the data and/or files are encrypted and stored in parts across multiple nodes 122 within the distributed file network 120. In particular, the distributed file network 120 is a structured peer-to-peer network that implements a distributed hash table to allow for efficient file retrieval in the distributed file network 120. The nodes 122 in the distributed file network 120 are connected to the network 104 via communication links (e.g. a direct link, or a link that traverses one or more networks, including both local and wide-area networks). Thus, the network 104 serves to interconnect the nodes 122 within the distributed file network 120. The distributed file network 120 may include one or more overlapping nodes with the call network 110. That is, one or more of the nodes 122 of the distributed file network 120 may also act as nodes 112 of the call network 110. The nodes 122 are similar to the nodes 112 and are generally computing devices capable of communicating via the network 104 to other nodes 122 in the distributed file network 120.

The identity network 130 is a collection of interconnected nodes 132 forming a peer-to-peer network. The identity network 130 is generally configured to store identity data to allow verification of user identities. In particular, the identity network 130 is configured to implement and maintain another DLS containing identity data for users of the call network 110. Said DLS is therefore referred to herein as the distributed identity ledger, or simply the identity ledger. For example, the identity ledger may store a key set (e.g. one or more public keys, for example to encrypt different data sets in an asymmetric public-key encryption scheme) associated with an endpoint (e.g. a user identifier, a MAC identifier, a device identifier, or the like). Each node 132 maintains a local copy of the identity ledger and is configured to maintain the ledger (e.g. by initiating updates, validating updates, and broadcasting updates). The nodes 132 in the identity network 130 are connected to the network 104 via communication links (e.g. a direct link or a link that traverses one or more networks, including both local and wide-area networks). Thus, the network 104 serves to interconnect the nodes 132 within the identity network 130. The identity network 130 may include one or more overlapping nodes with the call network 110 and the distributed file network 120. That is, one or more of the nodes 132 may also act as nodes 112 of the call network 110, and/or nodes 122 of the distributed file network 120.

The media server 140 is generally configured to facilitate a media connection between two endpoints (i.e. two nodes 112 in the call network 110). In particular, the nodes 112 may implement a webRTC protocol, and hence the media connection may be a webRTC media connection. The media server 140 may be a STUN (Session Traversal Utilities NAT (Network Address Translation)) server configured to facilitate a media connection between the two endpoints, following which, media may flow directly between the endpoints over the media connection. In other examples, the media server 140 may be a TURN (Traversal Using Relay NAT) server to facilitate a media connection between the two endpoints, as well as relaying the media between the two endpoints.

Figure 2:
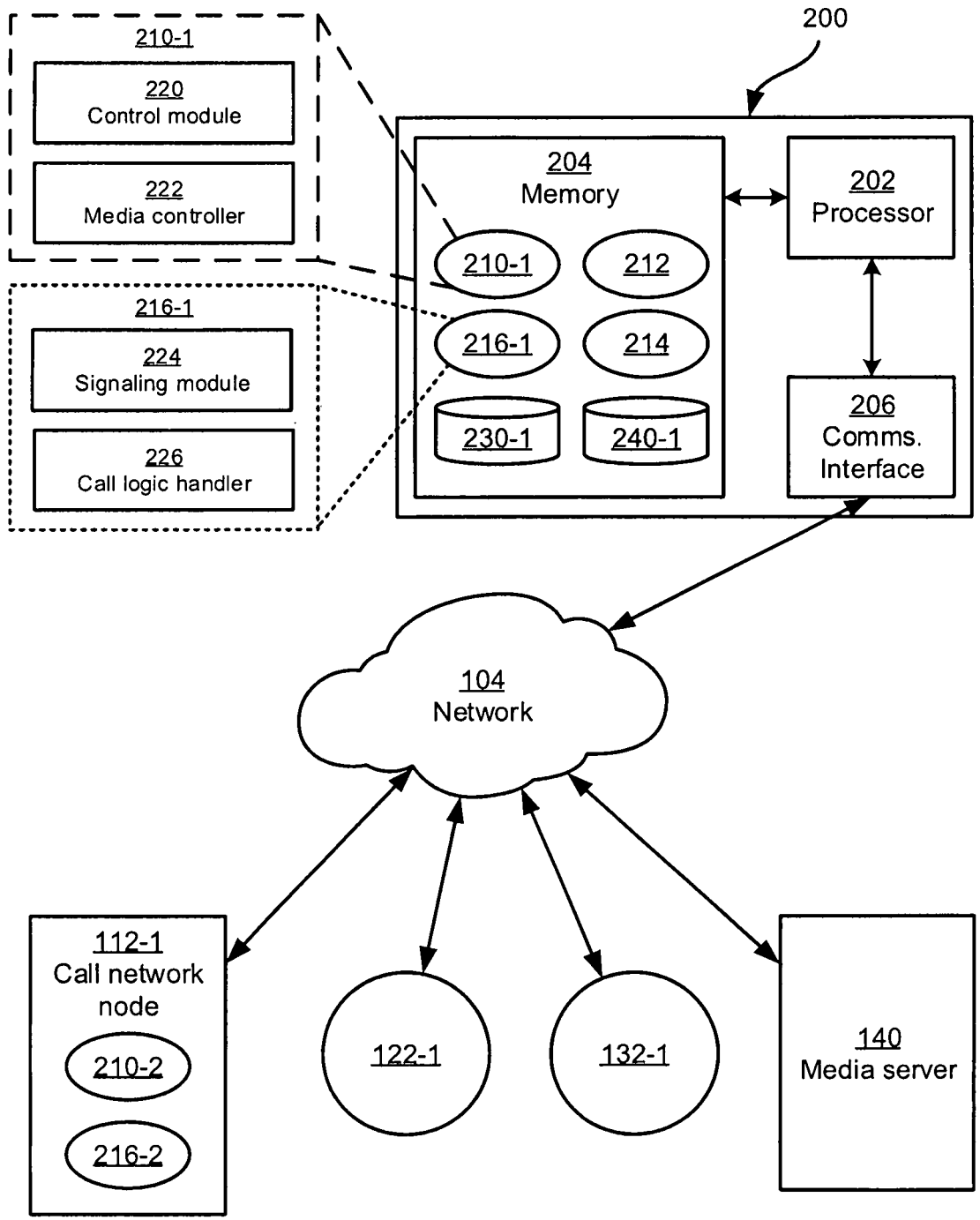
FIG. 2 depicts a block diagram of certain internal components of the components of system of FIG. 1.

FIG. 2 depicts an example computing device 200 capable of serving as a node 112 in the call network 110, a node 122 in the distributed file network 120, and a node 132 in the identity network 130. The computing device 200 may therefore also be referred to generally as a node 200. The computing device 200 includes a processor 202, a non-transitory computer-readable storage medium, such as a memory 204, and a communications interface 206.

The processor 202 may include a central-processing unit (CPU), a microcontroller, a microprocessor, a processing core, a field-programmable gate array (FPGA), or similar. The processor 202 may include multiple cooperating processors. The processor 202 may cooperate with the memory 204 to execute instructions to realize the functionality discussed herein. In particular, the processor 202 is configured to manage communications channels to other nodes 112 in the call network to allow interactions (e.g. audio/video calls, text messages, and the like) to be exchanged via the communications channel. The memory 204 may be a combination of volatile (e.g. Random Access Memory or RAM) and non-volatile memory (e.g. read only memory or ROM, Electrically Erasable Programmable Read Only Memory or EEPROM, flash memory). All or some of the memory 204 may be integrated with the processor 202. The processor 202 and the memory 204 may be comprised of one or more integrated circuits.

The processor 202 is also interconnected with the communications interface 206. The communications interface 206 includes suitable hardware (e.g. transmitters, receivers, network interface controllers and the like) allowing the computing device 200 to communicate with other computing devices via the network 104. In particular, the computing device 200 may communicate with an example call network node 112-1, an example distributed file network node 122-1, an example identity network node 132-1, and the media server 140 via the network 104. The specific components of the communications interface 206 are selected based on the nature of the network 104. The computing device 200 can also include input and output devices connected to the processor 202, such as keyboards, mice, displays, and the like (not shown).

The memory 204 stores a local copy 230-1 of a call ledger 230, and a local copy 240-1 of an identity ledger 240. The memory 204 may also store a private data repository (not shown). The memory 204 also stores a plurality of applications, each including a plurality of computer readable instructions executable by the processor 202. The applications stored in the memory 204 include a call network application 210-1, a distributed file network application 212, an identity network application 214, and a decentralized call network application 216-1 (also referred to simply as the decentralized application 216-1).

The call network node 112-1 also stores a call network application 210-2 and a decentralized call network application 216-2. Generally, the call network applications 210-1 and 210-2 provide substantially identical functionality at the node 200 and the node 112-1, and hence may be referred to generically as the call network application 210 executed at the node 200 or the call network node 112-1. Similarly, the decentralized applications 216-1 and 216-2 may be referred to generically as the decentralized application 216. Further, each distributed file network node 122 and identity network node 132 may execute, respectively, the distributed file network application 212 and the identity network application 214.

As will be understood by those skilled in the art, the processor 202 executes the instructions of the applications 210, 212, 214 and 216 (and any other suitable applications) in order to perform various actions defined by the instructions contained therein. In the description below, the processor 202, and more generally the computing device 200, or the node 200, are said to be configured to perform those actions. It will be understood that they are so configured via the execution (by the processor 202) of the instructions of the applications stored in the memory 204.

Execution of the call network application 210, as will be discussed in greater detail below, generally configures the node 200 to interact with other nodes 112 of the call network 110, including managing communication channels to other nodes 112. Specifically, the call network application 210 includes a control module 220 configured to control interaction with the nodes 112 of the call network 110. For example, the control module 220 may be configured to broadcast messages from the node 200 to adjacent nodes 112 in the call network 110 to be propagated across the call network 110. The messages may be, for example, a request from the node 200 to another node 112 to initiate a communications channel between the node 200 and the node 112. In some embodiments, the control module 220 may be configured to maintain the call ledger 230 and exchange updates to the call ledger 230 with other nodes 112. Thus, the request to initiate a communications channel may be in the form of a transaction or update registered to the call ledger 230.

The call network application 210 further includes a media controller 222. The media controller 222 is configured to manage media, including establishing a peer-to-peer media channel for the communications channel between the node 200 and the node 112-1. More specifically, the media controller 222 establishes the media channel via the media server 140.

The decentralized application 216 is an application executed on the call network 110 upon fulfillment of predefined criteria. For example, the decentralized application 216 may execute upon initiation of a request for a communications channel by the call network application 210. Specifically, the decentralized application 216 may be triggered at the end nodes of the communications channel (i.e. at the node 200 and the node 112-1). The decentralized application 216 includes a signaling module 224 configured to exchange and process signaling data between the node 200 and the node 112-1 to establish a signaling channel for the communications channel between the node 200 and the node 112-1. The decentralized application 216 further includes a call logic handler 226 configured to manage call control logic (e.g. voice controls, call waiting, and the like) during a call over the communications channel.

Execution of the distributed file network application 212, as will be discussed in greater detail below, generally configures the node 200 to interact with other nodes 122 of the distributed file network 120. In particular, the distributed file network application 212 may be configured to manage retrieval of files and/or data from other nodes 122 via the distributed hash table structure of the distributed file network 120.

Execution of identity network application 214, as will be discussed in greater detail below, generally configures the node 200 to interact with other nodes 132 of the identity network 130. More particularly, the identity network application 214 is configured to maintain the identity ledger 240 and exchange updates to the identity ledger 240 with other nodes 132.

As will be appreciated, in some examples, one or more of the applications 210, 212, 214 and 216 may be integrated into a single control application. Further, in some embodiments, the components of the call network application 210 and the decentralized application 216 may be implemented as a suite of distinct applications.

Figure 3:
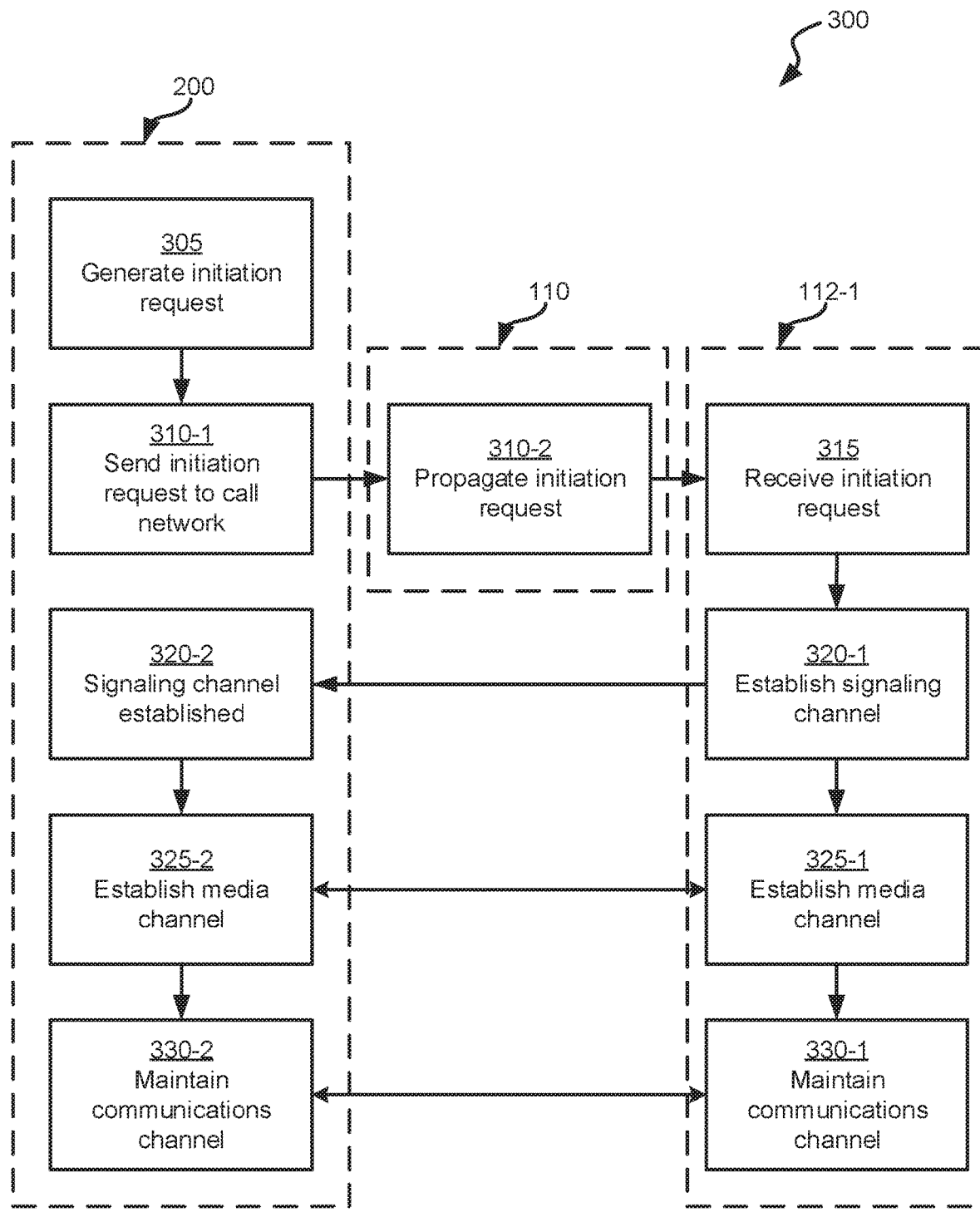
FIG. 3 depicts a flowchart of an example method of initiating a communications channel in the system of FIG. 1.

Turning now to FIG. 3, certain aspects of the operation of the system 100 will be described in greater detail. Specifically, FIG. 3 illustrates a method 300 of initiating a communications channel (e.g. to establish a call) within the system 100, and specifically, between the node 200 and the node 112-1 via execution of the applications 210, 212, 214, and 216.

The method is initiated at block 305, for example in response to input by a user of the computing device 200 to initiate a call to another user at the end node 112-1. Accordingly, the node 200 may be referred to herein as the source node 200, and the node 112-1 may be referred to as the destination node 112-1. To support the call between the user of the computing device 200 and the user of the end node 112-1, a communications channel, including a signaling channel and a media channel, must first be initiated between the computing device 200 and the end node 112-1.

Figure 4:
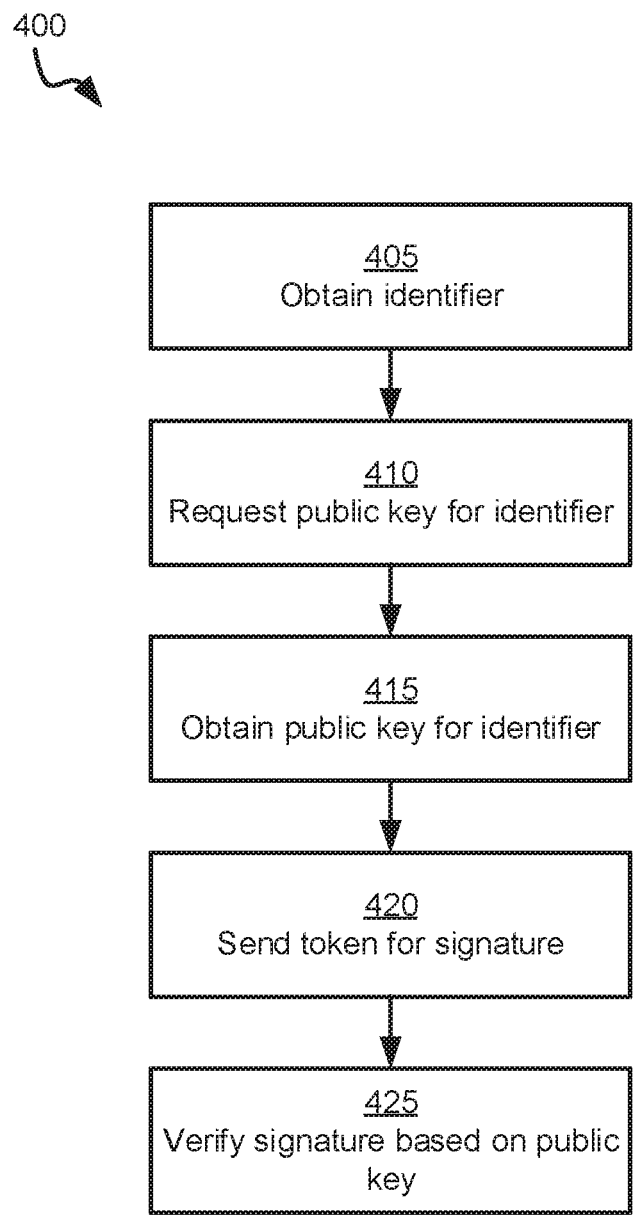
FIG. 4 depicts a flowchart of an example method of verifying an identity in the system of FIG. 1.

Further, to provide context to the call (e.g. to provide a call history, access to contacts, user preferences, and other personal data), the source node 200 may first be configured, at block 305, to verify an identity of the user at the source node 200. For example, referring to FIG. 4, an example method 400 of performing an identity verification operation at the node 200 is depicted.

At block 405, the processor 202, and in particular, the call network application 210 obtains an identifier, such as a user identifier, an address, or the like. The identifier may be obtained, based on the input request to initiate a call at block 305 of the method 300, or from additional user input.

At block 410, the processor 202, and in particular, the call network application 210, requests, from the identity network application 214, an identity key (i.e. the public key associated with the identifier obtained at block 405).

At block 415, the processor 202, and in particular, the identity network application 214 obtains the public key associated with the identifier obtained at block 405. Specifically, the identity network application 214 retrieves the public key from the local copy 240-1 of the identity ledger. The identity network application 214 may then communicate the public key to the call network application 210.

At block 420, the processor 202, and in particular, the call network application 210, sends a token for signature via the user's private key. The token may include, for example, a nonce and a time stamp.

At block 425, the processor 202, and in particular, the call network application 210, receives a signature (i.e. the signed token) for verification and verifies the signature using the public key received at block 420. Specifically, the signature includes the token sent at block 425, as signed using the private key for the user. Accordingly, the signature may be verified using the public key received at block 420 to ensure that the token was accurately encrypted.

If, at block 425, the signature is successfully verified, the identity verification operation is complete and the processor 202 may continue with initiating the communications channel. The identity network 130 thus allows public keys to be stored in a secure and tamper-resistant manner (i.e. due to the distributed nature of the identity ledger) while allowing users to control their own private keys. Further, the identity network 130 provides secure identity verification. It is further contemplated that in other embodiments, other methods of identity verification are possible.

Returning to FIG. 3, at block 305, after performing the identity verification operation, the source node 200 proceeds with establishing the communications channel. In particular, the source node 200 is configured to generate an initiation request to initiate a communications channel between the source node 200 and the destination node 112-1. The initiation request includes signaling data (e.g. Session Description Protocol or SDP data) for the source node 200 to allow the destination node 112-1 to establish a signaling channel.

At block 310-1, the source node 200, and in particular, the control module 220, is configured to send the initiation request to the peer-to-peer call network 110 to be propagated to the destination node 112-1. For example, the source node 200 may be configured to commit the initiation request as an initiation transaction to the call ledger 230-1. That is, the transaction to the call ledger 230-1 may include an identification of the source node 200 and the destination node 112-1, an indication of the initiation request from the source node 200 for a communications channel with the destination node 112-1, as well as the signaling data for the source node 200 to allow the destination node 112-1 to establish a signaling channel. The source node 200, and in particular the control module 220 may therefore further be configured to broadcast the transaction to the local call ledger 230-1 to the other nodes 112 in the call network 110 to update the general call ledger 230. More specifically, the source node 200 may first broadcast the transaction to adjacent nodes 112 in the call network 110.

In some embodiments, sending the initiation request at block 310-1 may fulfil the predefined criteria to trigger the decentralized application 216-1 at the source node 200. The decentralized application 216-1 may cooperate with the distributed file network application 212 to retrieve internal state data specific for execution of the decentralized application 216-1 (i.e. call and signaling management) at the source node 200. For example, the internal state data may include contact information, historical call data, stored messages, call logic handling preferences, and the like. Such internal state data may be encrypted and stored in parts on the distributed file network 120, and keyed, in the distributed hash table, to a node identity of the source node 200.

Figure 5:
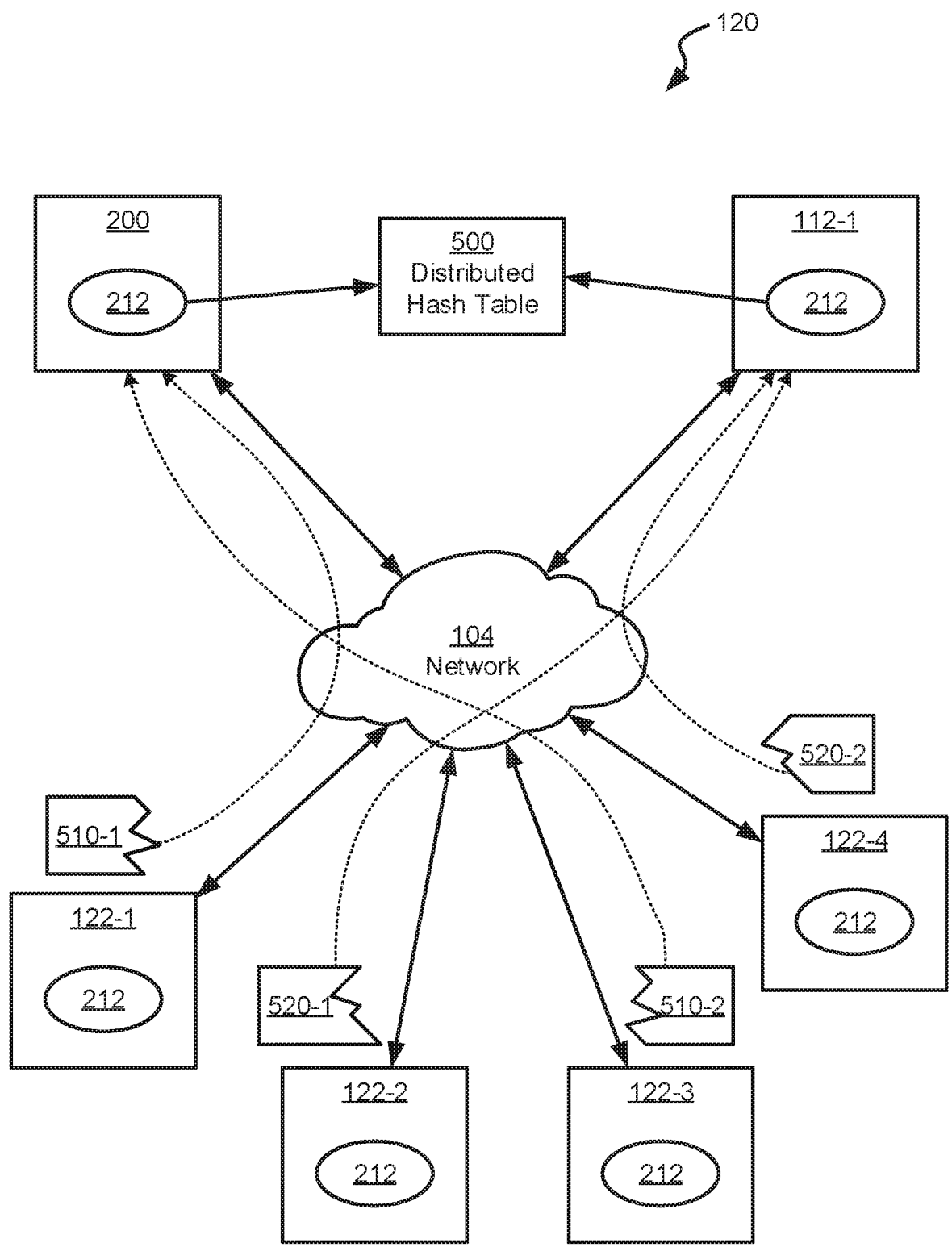
FIG. 5 depicts a schematic of a flow of data between the distributed file network nodes in the system of FIG. 2.

For example, referring to FIG. 5, a schematic of data flow in the distributed file network 120 is depicted. Upon initiation of the decentralized application 216-1 at the source node, the decentralized application 216-1 may request, from the distributed file network application, internal state data 510 for the source node 200. The distributed file network application 212 is configured to retrieve from a distributed hash table 500 of the distributed file network 120, node identities corresponding to one or more nodes 122 storing the internal state data for the source node 200. The distributed hash table 500 is similarly stored at nodes 122 in the distributed file network 120 but is depicted separately for clarity. In the present example, the internal state data 510 for the source node 200 is stored in fragments 510-1 and 510-2 at the distributed file network nodes 122-1 and 122-3 respectively. In other examples, the internal state data 510 may be stored in more than two fragments, and the fragments may be duplicated on different nodes 122 in the distributed file network 120. The distributed file network application 212 obtains the fragments 510-1 and 510-2 from the nodes 122-1 and 122-3 respectively and communicates the internal state data 510 to the decentralized application. In particular, the internal state data 510 is stored on the distributed file network 120 and external to the call ledger 230. Thus, each node 112 may retrieve different respective internal state data 510. Further, the decentralized application 216 may be triggered only at the relevant nodes for establishing and managing the communications channel.

In some embodiments, the source node 200 may further be configured, at block 310-1, to trigger the decentralized application 216-2 at the destination node 112-1. In particular, the source node 200 may retrieve, from the call network distributed hash table (DHT), a node identity of the destination node 112-1. The node identity may be based on, for example, a user identity associated with the destination node 112-1. The source node 200 may then trigger the decentralized application 216-2 to be executed at the destination node 112-1, for example, by sending, with the initiation request, an initiation signal to fulfil the trigger conditions for the decentralized application 216-2 to be executed at the destination node 112-1.

Returning to FIG. 3, at block 310-2, the nodes 112 of the call network 110 propagate the initiation request until it reaches the destination node 112-1. In particular, the nodes 112 may continue to broadcast the update to the call ledger 230.

At block 315, the destination node 112-1 receives the initiation request. In particular, the call network 110 may employ a low-latency consensus protocol to promote lower latency in receiving the initiation request at the destination node 112-1 and subsequently establishing the communications channel. In some embodiments, the initiation request may fulfil the predefined criteria to trigger the decentralized application 216-2 at the destination node 112-1.

Referring again to FIG. 5, upon initiation of the decentralized application 216-2 at the source node, the decentralized application 216-2 may request, from a corresponding distributed file network application 212, internal state data 520 for the destination node 112-1. The distributed file network application 212 retrieves, from the distributed hash table 500 of the distributed file network 120, identities of one or more nodes 122 storing the internal state data for the destination node 112-1. In the present example, the internal state data 520 is stored in fragments 520-1 and 520-2 at the distributed file network nodes 122-2 and 122-4 respectively. The distributed file network application 212 obtains the internal state data 520 from the nodes 122-2 and 122-4 and communicates the internal state data to the decentralized application 216-2.

In particular, the internal state data 510 for the source node 200 and the internal state data 520 for the destination node 112-1 may be different, and hence the decentralized applications 216 may have different operating parameters according to the respective internal state data 510 and 520. More generally, the distributed file network 120 may store distinct internal state data associated with each node 112 in the call network 110, and hence the decentralized applications 216 running at each node 112 in the call network may have different operating parameters, for example, according to user preferences and customizations.

Returning again to FIG. 3, at block 320-1, in response to receiving the initiation request, the destination node 112-1 establishes a signaling channel based on the signaling data from the initiation request. In particular, the signaling module 224 of the decentralized application 216-2 at the destination node 112-1 may establish a logical peer-to-peer connection between the destination node 11201 and the source node 200 based on the signaling data.

At block 320-2, the signaling channel is established at the source node 200. In particular, since the source node 200 provided relevant signaling data to the destination node 112-1 at block 310-1, the signaling channel may simply be established, without further input from the source node 200. In some embodiments, the source node 200 may be configured to verify that the established signaling channel is the expected signaling channel based on the initiation request generated at block 305.

At blocks 325-1 and 325-2, a media channel is established between the source node 200 and the destination node 112-1 via the media server 140. In some examples, the media channel may be established by the source node 200, and in particular, by the media controller 222 of the call network application 210. In particular, the media controller 222 may implement a webRTC protocol to allow peer-to-peer media connection via the media server 140. In other examples, the media channel may be established by the destination node 112-1. Together, the signaling channel established at blocks 320-1 and 320-2 and the media channel established at blocks 325-1 and 325-2 form a communications channel between the source node 200 and the destination node 112-1. The communications channel allows for interactions (e.g. audio, video, text) between the source node 200 and the destination node 112-1. In particular, the call, as initiated by the user of the source node 200 to the user of the destination node 112-1, may be carried out over the communications channel.

In some embodiments, an indication of the communications channel may be committed to the call ledger 230. For example, the source node 200, and in particular, the control module 220, may be configured to commit the indication of the communications channel as a channel transaction to the call ledger 230 and broadcast the update to other nodes 112 in the call network 110. The transaction may include an identification of the source node 200 and the destination node 112-1, an indication of a successfully established communications channel between the source node 200 and the destination node 112-1, a time stamp indicating the time of connection, and the like. The transaction may then be propagated to other nodes 112 to update the call ledger 230. The call ledger 230 thus provides an open, tamper-resistant log of established communications channels on the call network 110.

At blocks 330-1 and 330-2, the communications channel is maintained and various interactions (e.g. audio/video calls, text messages and the like) may be exchanged between the source node 200 and the destination node 112-1. In particular, the call logic handler 226 of the decentralized application 216 is configured to manage call control logic (e.g. voice controls, call waiting, and the like) during interactions over the communications channel. Further, the call logic handler 226 may use the internal state data specific to each node to handle the call control logic differently at each node, per user-defined preferences. For example, the internal state data may specify a method of handling an incoming call during an ongoing call. At the source node 200, the incoming call may go directly to a voice mail system. In contrast, an incoming call during an ongoing call at the destination node 112-1 may trigger an alert for the user of the destination node 112-1. As can be seen, each user may customize the call logic handler 226 and store preferences and customization as internal state data stored on the distributed file network 120. In particular, the present system provides the advantage reducing the number of core components required to contain and manage call handling logic. Further, the present system provides customization without imposing increased data storage for said core components to implement the customization. Additionally, updates to the decentralized application and the call handling logic are seamless and require fewer core components to contain the unified communications logic. Third-party and user-designed decentralized applications may thus be integrated and implemented in the system 100, without requiring updates to centralized components of the system. Rather, customizable and programmable instructions for call handling may be managed in decentralized applications capable of being executed at different individual nodes 112.

Figure 6:
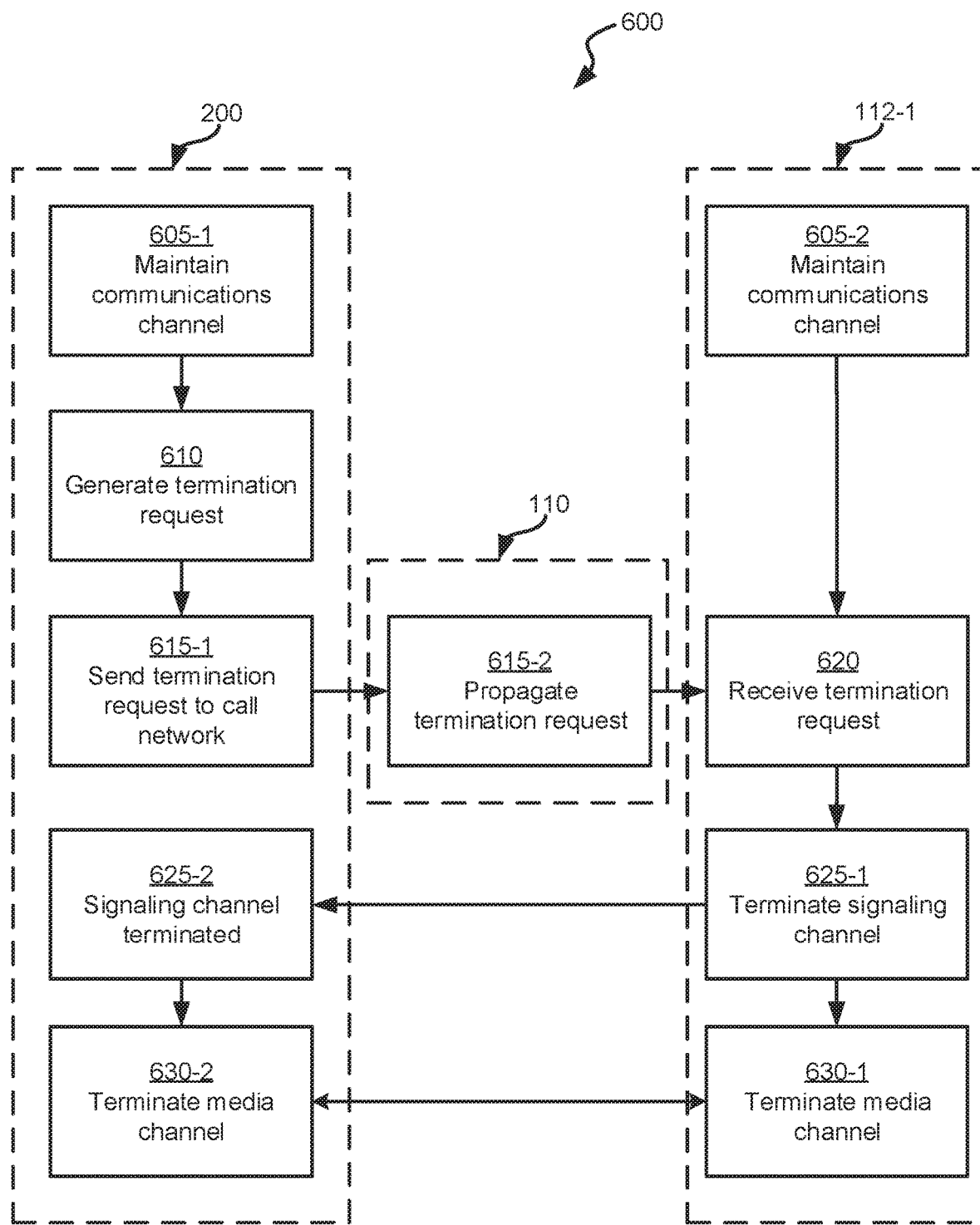
FIG. 6 depicts a flowchart of an example method of terminating a communications channel in the system of FIG. 1.

Referring now to FIG. 6, an example method 600 of terminating a communications channel is depicted.

At blocks 605-1 and 605-2, the communications channel is maintained and various interactions (e.g. audio/video calls, text messages and the like) may be exchanged between the source node 200 and the destination node 112-1. The call logic handler 226 of the decentralized application 216 is configured to manage call control logic (e.g. voice controls, call waiting, and the like) during interactions over the communications channel. Further, the call logic handler 226 may use the internal state data specific to each node to handle the call logic differently at each node, per user-defined preferences.

At block 610, the source node 200 is configured to generate a termination request to terminate the communications channel between the source node 200 and the destination node 112-1. The termination request may be generated, for example, in response to the user terminating a call (e.g. a voice call) or similar.

At block 615-1, the source node 200, and in particular the control module 220, is configured to send the termination request to the peer-to-peer call network 110 to be propagated to the destination node 112-1. For example, the source node may be configured to commit the termination request as a transaction to the call ledger 230-1. That is, the transaction to the call ledger 230-1 may include an identification of the source node 200 and the destination node 112-1, an indication of the termination request from the source node 200, a time stamp indicating the time of the request, and other relevant data. The source node 200, and in particular the control module 220 may therefore further be configured to broadcast the transaction to the other nodes 112 in the call network 110 to update the call ledger 230. More specifically, the source node 200 may first broadcast the transaction to adjacent nodes 112 in the call network 110.

At block 615-2, the nodes 112 of the call network 110 propagate the initiation request until it reaches the destination node 112-1. In particular, the nodes 112 may continue to broadcast the update to the call ledger 230.

At block 620, the destination node 112-1 receives the initiation request from the call network 110. In other examples, the destination node 112-1 may generate the termination request and proceed directly to block 620.

At block 625-1, in response to receiving the termination request, the destination node 112-1 terminates the signaling channel. At block 625-2, the signaling channel is terminated at the source node.

At block 630-1 and 630-2, the media channel between the source node 200 and the destination node 112-1 is terminated. In some examples, the media channel may be terminated by the source node 200, while in others, the media channel may be terminated by the destination node 112-1.

The communications channel is thus terminated. In some embodiments, an indication of the termination of the communications channel may be recorded on the call ledger 230. For example, the source node 200, and in particular the control module 220, may be configured to commit the termination of the communications channel as a transaction to the call ledger and broadcast the update to other nodes 112 in the call network 110. The transaction may include an identification of the source node 200 and the destination node 112-1, an indication of the terminated communications channel between the source node 200 and the destination node 112-1, a time stamp indicating the time of termination, and other relevant data. The transaction may then be propagated to other nodes 112 to update the call ledger 230.

The distributed call ledger 230 the transactions stored thereon may thus be used to route and set up communications channels to enable interactions (e.g. audio/video calls, text messages, and the like) between endpoints. The transactions may store the signaling data to set up the signaling portion of the communications channel and thus trigger a logical peer-to-peer signaling connection between the endpoints. The transactions may further record indications of established communications channels, and indications of terminated communications channels. Further, the distributed nature of the call ledger 230 provides an open, tamper-resistant log of all call network activity for each node 112 in the call network 110. For example, Table 1 is an example call ledger containing transactions storing communications channel data.

TABLE 1

Call ledger

| Transaction ID | Node A | Node B | Action | Notes | Time Stamp |
|---|---|---|---|---|---|
| 123456 | 4321 | 1357 | Initiation Request | 4321 Signal: XXX-XXXX | 2019-05-31 09:00:17 |
| 123457 | 1357 | 4321 | Connection Established | Chanel ID: 4321-012 | 2019-05-31 09:01:03 |
| 135426 | 7758 | 1536 | Connection Established | Channel ID: 7758-238 | 2019-05-31 09:02:56 |
| ... | ... | ... | ... | ... | ... |
| 158761 | 4321 | 1357 | Termination Request | Channel ID: 4321-012 | 2019-05-31 09:53:24 |

In some embodiments, the transactions may be used to extract call network activity for each node, for example, for billing purposes. That is, the transactions may trigger billing events for real-time pay-per-use based on establishment and termination of communications channels over the call network 110.

As will be appreciated, various alternatives and embodiments are possible. For example, the call network 110, the distributed file network 120, and the identity network 130 are depicted separately, but may include the same interconnected computing devices of the system 100. Specifically, each node may simultaneously manage different aspects (i.e. calls/communications channels, call ledger, distributed file system, and identity ledger) of the system 100. Further, as noted above, the applications 210, 212, 214, and 216 may be integrated into a single control application stored as computer-readable instructions on a non-transitory computer-readable storage medium of each node.

That is, the control application may configure the client node (i.e. the node on which the control application resides) to interact with other nodes of the network to manage communications channels to other nodes, including managing call logic customization, maintain and exchange updates to the call ledger and the identity ledger, and manage retrieval of files and/or data from the distributed file system.

More particularly, the control application can generate initiation requests to initiate communications between the client node and an end node, propagate initiation requests, establish signaling channels between the client node and the end node, establish media channels between the client node and the end node, generate termination requests, propagate the termination requests, terminate the signaling channels, and terminate the media channels. The control application may do so by committing transactions indicative of a status of the communications channel (i.e. initiation request sent, communications channel established, communications channel terminated) to the call ledger and broadcasting the transaction to the network. The control application may further trigger one or more billing events based on the transactions, indicative of the status of the communications channels (e.g. when a communications channel is terminated, based on a time duration between establishment and termination).

The control application may further verify a user identity by obtaining an identifier for the user, obtaining a public key from the identity ledger, send a token for signature, and verify the signature based on the public key.

The control application may further include a decentralized application triggered to be executed upon fulfillment of predefined criteria. Upon fulfillment of the predefined criteria, the control application may retrieve, based on data from the DHT for the distributed file system, internal state data for the client node. The decentralized application may be executed based on the internal state data to establish signaling channels, as well as managing call control logic during a call over the communications channel. Thus, the control application allows for customizable, programmable (e.g. as provided by a third party or by users) and user-centric decentralized applications which may be implemented in a call network system without updates and storage of the logic at core components of the call network system.

The scope of the claims should not be limited by the embodiments set forth in the above examples, but should be given the broadest interpretation consistent with the description as a whole.

The invention claimed is:

1. A method at a source node in a peer-to-peer call network, the method comprising:
    generating an initiation request to initiate a communications channel between the source node and a destination node in the peer-to-peer call network, the initiation request including signaling data for the source node to allow the destination node to establish a signaling channel;
    in response to generating the initiation request, obtaining, from a distributed file network, internal state data for the source node, the internal state data defining call control logic for the source node;
    triggering a decentralized application to manage the communications channel;
    committing the initiation request as a transaction to a local copy of a distributed call ledger stored at the source node;
    broadcasting the transaction to the peer-to-peer call network to update the distributed call ledger to propagate the transaction to the destination node; and
    when the signaling channel between the source node and the destination node has been established, establishing a peer-to-peer media channel between the source node and the destination node, wherein the signaling channel and the media channel form the communications channel between the source node and the destination node; and
    managing, via the decentralized application, the call control logic of the communications channel for the source node based on the internal state data.

2. The method of claim 1, further comprising:
    generating a termination request to terminate the communications channel between the source node and the destination node, the termination request configured to trigger the destination node to terminate the signaling channel;
    committing the termination request as a further transaction to the local copy of the distributed call ledger stored at the source node;
    broadcasting the further transaction to the peer-to-peer call network to update the distributed call ledger to propagate the further transaction to the destination node; and
    when the signaling channel has been terminated, terminating the media channel.

3. The method of claim 1, further comprising:
    requesting, from a distributed hash table stored on the peer-to-peer call network, an identifier of the destination node; and
    sending, with the initiation request, an initiation signal to the peer-to-peer call network to be propagated to the destination node, the initiation signal to trigger a corresponding decentralized application at the destination node based on the identifier of the destination node.

4. The method of claim 1, further comprising:
    prior to generating the initiation request, obtaining an identifier for a user of the source node;
    requesting, from a distributed identity ledger, an identity key for the user of the source node; and
    verifying, based on the identifier and the identity key, an identity of the user.

5. A method in a destination node in a peer-to-peer call network, the method comprising:
    receiving, from the peer-to-peer call network, an update for a distributed call ledger stored at the destination node;
    extracting, from the update, an initiation transaction including an initiation request to initiate a communications channel between a source node and the destination node, the initiation request including signaling data for the source node;
    in response to the initiation request, obtaining from a distributed file network, internal state data for the destination node, the internal state data defining call control logic for the destination node;
    triggering a decentralized application to manage the communications channel;
    establishing a signaling channel between the source node and the destination node based on the signaling data for the source node; and
    establishing a peer-to-peer media channel between the source node and the destination node, wherein the signaling channel and the media channel form the communications channel; and
    managing, via the decentralized application, the call control logic of the communications channel for the destination node based on the internal state data.

6. The method of claim 5, further comprising:
    responsive to establishing the communications channel, committing a channel transaction to a local copy of the distributed call ledger stored at the destination node, the channel transaction including an indication of the established communications channel; and
    broadcasting the channel transaction to the peer-to-peer call network to update the call ledger.

7. The method of claim 5, further comprising:
    receiving a termination request to terminate the communications channel between the source node and the destination node; and
    responsive to receiving the termination request, terminating the signaling channel and the media channel.

8. The method of claim 5, further comprising:
    receiving, with the initiation request, an initiation signal to trigger the decentralized application at the destination node; and
    wherein the decentralized application is configured to control the destination node to establish the signaling channel between the source node and the destination node based on the signaling data for the source node.

9. A non-transitory computer-readable medium storing a plurality of computer-readable instructions executable by a processor of a client node, wherein execution of the instructions configures the processor to:
    generate an outgoing initiation request to initiate a first communications channel between the client node and a first end node, the outgoing initiation request including signaling data for establishing a first signaling channel between the client node and the first end node;

commit the outgoing initiation request as a transaction to a local copy of a distributed call ledger stored at the source node;
broadcast the transaction to a peer-to-peer call network of the client node to propagate the outgoing initiation request to the first end node;
in response to the initiation request, obtain from a distributed file network, internal state data for the client node, the internal state data defining call control logic for the client node;
triggering a decentralized application to manage the communications channel; and
establish a first media channel between the client node and the first end node, the first media channel and the first signaling channel forming the first communications channel; and
manage, via the decentralized application, the call control logic of the communications channel for the client node based on the internal state data.

10. The non-transitory computer-readable medium of claim 9, wherein execution of the instructions further configures the processor to:
receive, from the peer-to-peer call network, an update for the call ledger;
extracting, from the update, an initiation transaction including an incoming initiation request to initiate a second communications channel between the client node and a second end node;
responsive to the incoming initiation request, establishing a second signaling channel between the client node and the second end node based on signaling data for the second end node from the initiation request; and
establishing a second media channel between the client node and the second end node, the second media channel and the second signaling channel forming the second communications channel.

11. The non-transitory computer-readable medium of claim 10, wherein execution of the instructions further configures the processor to, responsive to receiving a termination request to terminate the second communications channel between the client node and the second end node:
terminate the second signaling channel; and
terminate the second media channel.

12. The non-transitory computer-readable medium of claim 9, wherein execution of the instructions further configures the processor to:
commit transactions indicative of a status of the first communications channel to a local copy of a distributed call ledger stored at the client node; and
broadcast the transaction to update the call ledger.

13. The non-transitory computer-readable medium of claim 12, wherein execution of the instructions further configures the processor to trigger a billing event based on the transactions indicative of the status of the first communications channel.

14. The non-transitory computer-readable medium of claim 9, wherein execution of the instructions further configures the processor to, prior to generating the outgoing initiation request;
obtain an identifier for a user;
obtain, from a distributed identity ledger, a public key associated with the identifier;
send a token for signing by the user; and
verify the signed token based on the public key.

15. The non-transitory computer-readable medium of claim 9, wherein execution of the instructions further configures the processor to, to manage the call control logic:
retrieve, from a distributed hash table, node identities of the distributed file network corresponding to nodes storing the internal state data for the client node;
obtain, from the nodes corresponding to the node identities, the internal state data for the client node; and
execute the decentralize application at the client node based on the internal state data for the client node.

16. The method of claim 1, wherein the call control logic comprises one or more of; voice controls and call wafting configurations.

* * * * *